(12) United States Patent
Fussinger et al.

(10) Patent No.: US 7,245,228 B2
(45) Date of Patent: Jul. 17, 2007

(54) PORTABLE ELECTRONIC APPARATUS WITH CONTROLLED LIGHT SOURCES

(75) Inventors: Thomas Fussinger, Erkheim (DE); Victor Burger, Blaustein (DE); Maik Kobald, Forchtenberg (DE); Panu Johansson, Tampere (FI)

(73) Assignee: Nokia Corporation, Espoo (FI)

( * ) Notice: Subject to any disclaimer, the term of this patent is extended or adjusted under 35 U.S.C. 154(b) by 165 days.

(21) Appl. No.: 10/855,848

(22) Filed: May 27, 2004

(65) Prior Publication Data

US 2005/0275559 A1 Dec. 15, 2005

(51) Int. Cl.
*G08B 5/00* (2006.01)

(52) U.S. Cl. .............. 340/815.4; 340/693.4; 340/815.45; 340/815.52; 315/291; 315/307; 362/510; 362/543

(58) Field of Classification Search ........... 340/815.4, 340/815.45, 815.49, 815.5, 815.55, 815.6, 340/815.65, 815.69, 693.4, 815.52; 362/227, 362/231, 800, 510, 543; 315/291, 292, 297, 315/307, 312; 345/210, 530
See application file for complete search history.

(56) References Cited

U.S. PATENT DOCUMENTS

| 6,523,976 | B1 * | 2/2003 | Turnbull et al. ............ 382/231 |
| 6,777,891 | B2 * | 8/2004 | Lys et al. ................... 315/291 |
| 6,897,624 | B2 * | 5/2005 | Lys et al. ................... 315/297 |

* cited by examiner

*Primary Examiner*—Davetta W. Goins
(74) *Attorney, Agent, or Firm*—Perman & Green, LLP

(57) ABSTRACT

A portable electronic apparatus has light sources that can be controlled to produce decorative or informational effects. Each light source is controlled by the combination of an enable signal from a 1-bit port of a controller and a PWM signal from a PWM signal from the controller. Each PWM signal is used to control a plurality of light sources in parallel whereas each 1-bit enabled signal controls, generally, only one. The light sources are preferably arranged to shine through soft structures on the apparatus.

26 Claims, 3 Drawing Sheets

US 7,245,228 B2

PORTABLE ELECTRONIC APPARATUS WITH CONTROLLED LIGHT SOURCES

FIELD OF THE INVENTION

The present invention relates to a portable electronic apparatus such as a mobile phone, a personal digital assistant (PDA) or the like.

BACKGROUND TO THE INVENTION

Conventionally mobile phones and the like indicate events, such as incoming calls or text messages, using audible alerts.

SUMMARY OF THE INVENTION

It is an object of the present invention to provide a mobile phone, PDA or the like with informative and/or decorative lighting effects.

According to the present invention, there is provided a portable electronic apparatus, for example a personal communication apparatus such as a mobile phone or a communicator, comprising:
  a group of, preferably externally visible, light sources, e.g. LEDs emitting light in the visible spectrum, and
  a programmable controller device having a plurality of 1-bit outputs connected for controlling the light sources and a pulse width modulated signal output for controlling said group of light sources,
  wherein each light source is controlled by means of one of said 1-bit outputs and said PWM output.

Each light source may be controlled by a respective one of said 1-bit outputs.

The apparatus may include a plurality of bipolar transistors connected to receive a signal from respective 1-bit outputs of the controller device at their bases, with each light source being controlled by one of said transistors. Such an apparatus may also include an insulated-gate FET, connected to receive a signal from the PWM output of the controller, with the emitters of said transistors are connected to the drain of the FET via respective emitter resistors.

The light sources may be controlled individually by respective first switching means, connected to be controlled from said 1-bit outputs, and collectively by second switching means, connected to the controlled from said PWM signal output, in which case, the second switching means, is connected in series with all of said first switching means.

According to the present invention, there is also provided a portable electronic, for example a personal communication apparatus such as a mobile phone or a communicator, apparatus comprising:
  a plurality of groups of, preferably externally visible, light sources, e.g. LEDs emitting light in the visible spectrum, and
  a programmable controller device having a plurality of 1-bit outputs connected for controlling the light sources and a plurality of pulse width modulated signal outputs for controlling respective ones of said groups of light sources,
  wherein each light source is controlled by means of one of said 1-bit outputs and one of said PWM outputs.

Each light source may be controlled by a respective one of said 1-bit outputs.

The apparatus may include a plurality of bipolar transistors connected to receive signals from respective 1-bit outputs of the controller device at their bases, with each light source being controlled by one of said transistors. Such an apparatus may include a plurality of insulated-gate FET, connected to receive a signal from one of said PWM outputs of the controller, with the emitters of said transistors being connected to the drain of one or other of the FETs via respective emitter resistors according to the groups to which the light sources, controlled by the transistors, belong.

The light sources may be controlled individually by respective first switching means, e.g. bipolar transistors or field-effect transistors, connected to be controlled from said 1-bit outputs, and groupwise by second switching means e.g. bipolar transistors or field-effect transistors, connected to the controlled from said PWM signal outputs, with each second switching means being connected in series with all of said first switching means associated with the same group of light sources.

According to the present invention, there is also provided a portable electronic apparatus, for example a personal communication device, comprising a body and a soft structure on the body, wherein the soft structure is visible light transmissive, e.g. fully or partially transparent or translucent, and a light source is mounted to the body so as to shine light through said structure.

The light source may comprise at least one device, for example an LED.

A plurality of soft structures may be included on the body; in which case, each soft structure will be visible light transmissive and a group of light sources is mounted to the body to shine light through said structures.

The light sources may be controlled using the 1-bit and PWM controller outputs mentioned above.

DETAILED DESCRIPTION OF THE EMBODIMENTS

Embodiments of the present invention will now be described, by way of example, with reference to the accompanying drawings.

Figure 1:
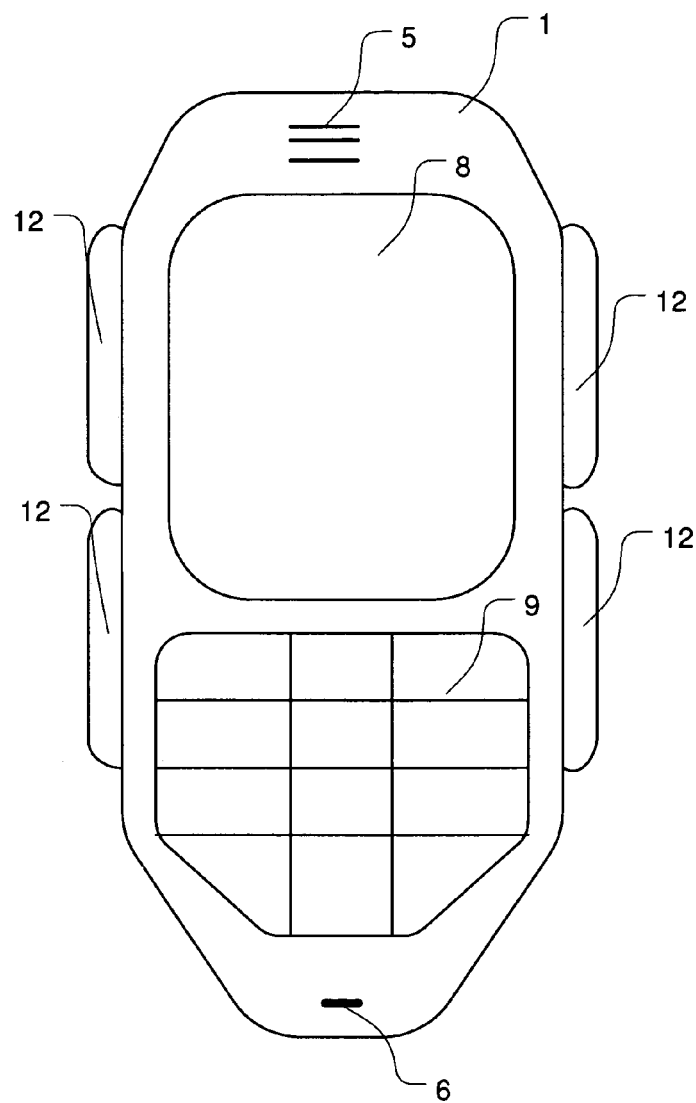
FIG. 1 is a front view of a mobile phone embodying the present invention.
Figure 2:
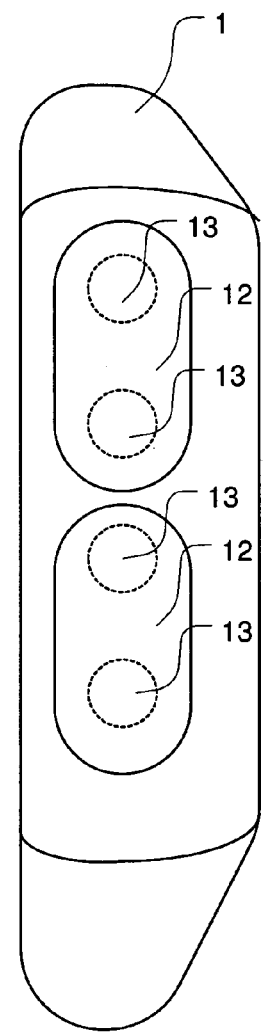
FIG. 2 is a side view of the mobile phone shown in FIG. 1.

Referring to FIGS. 1 and 2, a mobile phone comprises a body 1 having a liquid crystal display 8 in the upper part of its front face and keypad 9 in the lower part of its front face. A speaker 5 is located above the display 8 and a microphone 6 is located below the key pad 9. Two soft, transparent pads 12, forming grips, are formed on each of the left and right sides of the body 1, one above the other. The pads 12 may be coloured. The pads 12 comprise polyurethane shells filled with a gel. The pads 12 help users hold the mobile phone securely and comfortably.

Two light emitting diodes 13 (LEDs) are located behind each of the pads 12. The LEDs are controlled, as will be described below, to provide decorative and/or informative lighting effects.

Figure 3:
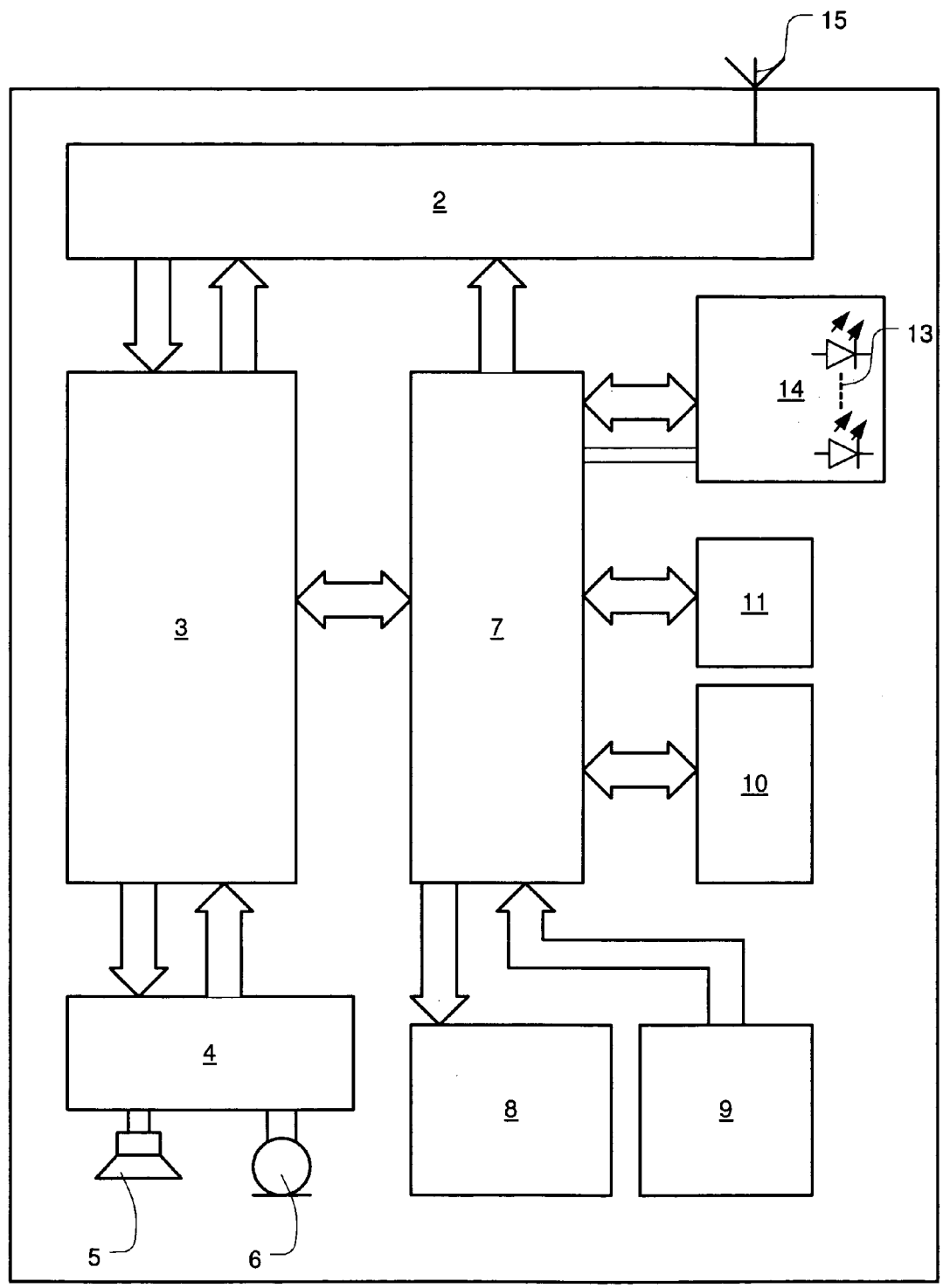
FIG. 3 is a block diagram of the mobile phone shown in FIG. 1.

Referring to FIG. 3, the mobile phone additionally comprises an antenna 15, an rf subsystem 2, a baseband DSP (digital signal processing) subsystem 3, an analogue audio subsystem 4, a controller 7, memory 10, a SIM card 11 and an LED driver circuit 14 for energising the LEDs 13 under the control of the controller 7.

The rf subsystem 2 contains if and rf circuits of the mobile telephone's transmitter and receiver and a frequency synthesizer for tuning the mobile station's transmitter and receiver. The antenna 15 is coupled to the rf subsystem 2 for the reception and transmission of radio waves.

The baseband DSP subsystem 3 is coupled to the rf subsystem 2 to receive baseband signals therefrom and for sending baseband modulation signals thereto. The baseband D SP subsystems 3 includes codec functions which are generally well-known in the art. However, the codec functions include a novel Viterbi decoder, which is described in more detail below, for channel decoding. The output of the Viterbi decoder is then further decoded to regenerate the original speech signal in the case of telephony.

The analogue audio subsystem 4 is coupled to the baseband DSP subsystem 3 and receives demodulated audio therefrom. The analogue audio subsystem 4 amplifies the demodulated audio and applies it to the speaker 5. Acoustic signals, detected by the microphone 6, are pre-amplified by the analogue audio subsystem 4 and sent to the baseband DSP subsystem 3 for coding.

The controller 7 controls the operation of the mobile telephone. It is coupled to the rf subsystem 2 for supplying tuning instructions to the frequency synthesizer and to the baseband DSP subsystem 3 for supplying control data and management data for transmission. The controller 7 operates according to a program stored in the memory 10. The memory 10 is shown separately from the controller 7. However, it may be integrated with the controller 7.

The display device 8 is connected to the controller 7 for receiving control data and the keypad 9 is connected to the controller 7 for supplying user input data signals thereto.

The controller 7 is programmed to control the mobile station for speech and data communication and with application programs, e.g. a WAP browser, which make use of the mobile station's data communication capabilities. The controller 7 is also programmed to produced different lighting effects by selectively energising the LEDs 12.

Figure 4:
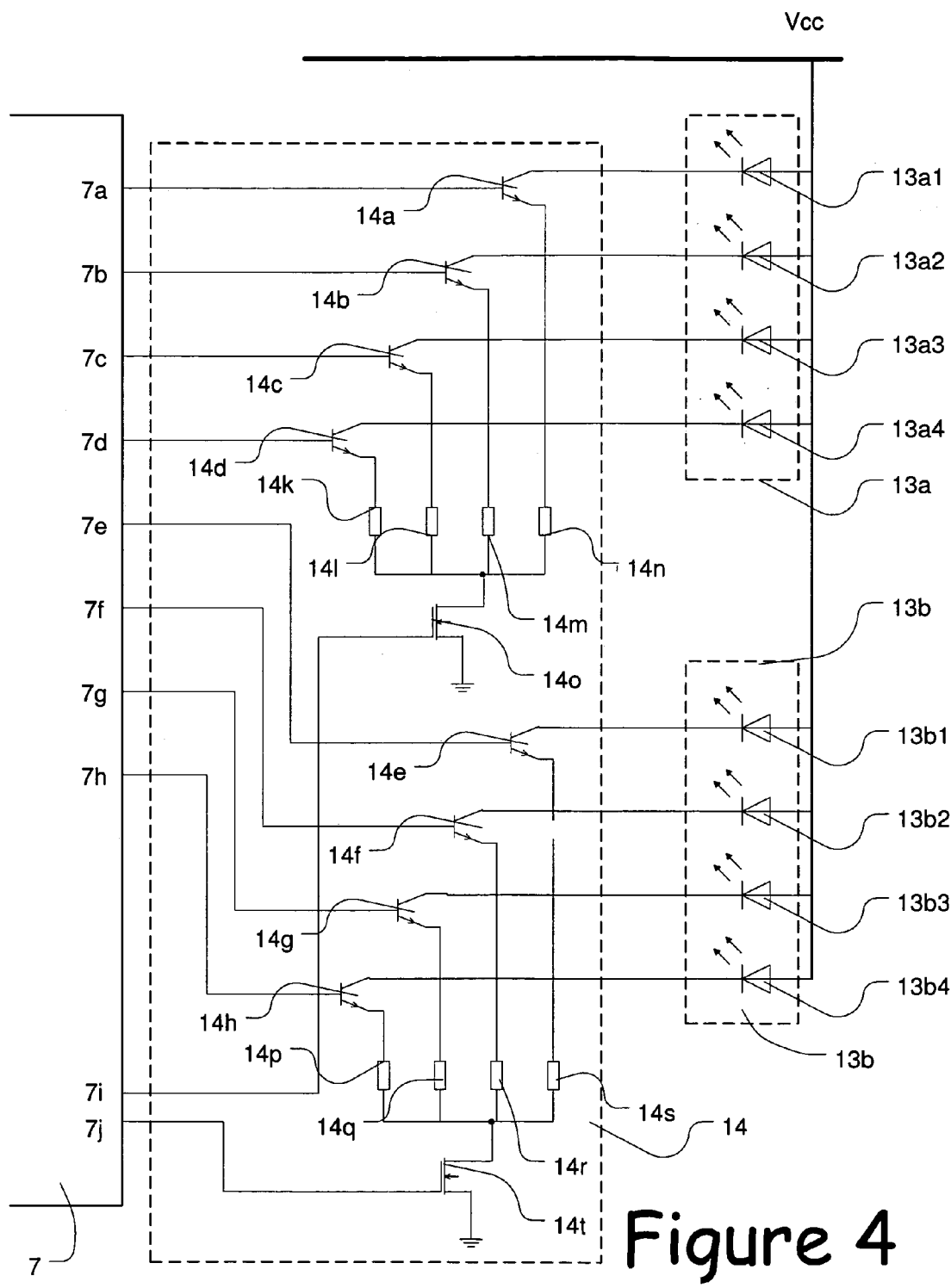
FIG. 4 is a schematic diagram of the light source controlling circuit of the mobile phone shown in FIG. 1.

Referring to FIG. 4, in which pull-up and biasing resistors and other common ancillary components are omitted for clarity's sake, the controller 7 has first to eighth independently controllable 1-bit output ports 7a, ..., 7h and first and second independently controllable pulse with modulated (PWM) signal outputs 7i, 7j.

The LED driver circuit 14 comprises first to eighth bipolar transistors 14a, ..., 14h. The bases of the bipolar transistors 14a, ..., 14h are connected to respective output ports 7a, ..., 7h of the controller 7. The collectors of the bipolar transistors are connected to the cathodes of respective ones 13a1, ..., 13a4, 13b1, ..., 13b4 of the diodes 13. The anodes of the diodes 13 are connected to Vcc.

The first to fourth bipolar transistors 14a, ..., 14d have respective emitter resistors 14k, ..., 14n. The emitter resistors 14k, ..., 14n connect the emitters of the first to fourth bipolar transistors 14a, ..., 14d to the drain of a first MOSFET 14o. The source of the first MOSFET 14o is connected to ground and its gate is connected to the first PWM signal output 7i of the controller 7.

The fifth to eighth bipolar transistors 14e, ..., 14h are similarly arranged with respective emitter resistors 14p, ..., 14s and a second MOSFET 14t. The gate of the second MOSFET 14t is connected to the second PWM signal output 7j of the controller 7.

The LEDs 13a1, ..., 13a4, 13b1, ..., 13b4 can be individually and independently enabled by the controller 7 using the signals at the 1-bit output ports 7a. However, the intensities of the LEDs 13a1, ..., 13a4, 13b1, ..., 13b4 are controlled by the PWM signals from the first and second PWM signal outputs 7i, 7j. It can be seen that for the purpose of control, the LEDs 13a1, ..., 13a4, 13b1, ..., 13b4 are divided into two groups 13a, 13b controlled respectively from the first and second PWM signal outputs 7i, 7j. The LED intensities can set by the duty cycles of the PWM signals when the frequencies of the PWM signals are greater than about 25 Hz. Below about 25 Hz the on/off operation of LEDs 13a1, ..., 13a4, 13b1, ..., 13b4 in response to the PWM signals is perceptible and, at these lower frequencies, the PWM signals can be used to generate complex LED flashing sequences in combination with suitable LE D enable signals from the 1-bit outputs 7a, ..., 7h.

The controller 7 is a program controlled device and the programming required to control the LEDs 13a1, ..., 13a4, 13b1, ..., 13b4 will be readily apparent to the skilled person from the foregoing. Different patterns of illumination using the LEDs 13 may be used to signal different events such as incoming calls or text messages or to accompany games, being played on the mobile phone, or other apparatus, in which the present invention is embodied.

The grouping of the LEDs 13a1, ..., 13a4, 13b1, ..., 13b4 for control purposes is independent of their physical arrangement on the mobile phone's body 1. For example, the LEDs 13 on the left side of the mobile phone's body may all be in one group 13a and the LEDs 13 on the other side of the mobile phone may all be in the other group 13b. Alternatively, the LEDs 13 may be arranged such that alternate LEDs 13 belong to different groups 13a, 13b.

The skilled person will appreciate that the present invention may be applied to other portable electronic devices where the number of PWM signals is limited and that various alternatives and equivalents to the elements described above may be used without departing from the spirit or scope of the claims appended hereto.

What is claimed is:

1. A portable electronic apparatus comprising:
   a group of light sources; and
   a programmable controller device having,
      a plurality of 1-bit outputs each connected for enabling a respective individual light source in the group of light sources, and
      a pulse width modulated signal (PWM) output for controlling an intensity of said group of light sources;
   wherein each individual light source is controlled by said plurality of 1-bit outputs and said PWM output.

2. An apparatus according to claim 1, wherein each light source is controlled by a respective one of said 1-bit outputs.

3. An apparatus according to claim 1, including a plurality of bipolar transistors, connected to receive signals from respective 1-bit outputs of the controller device at their bases, wherein each light source is controlled by one of said transistors.

4. An apparatus according to claim 3, including an insulated-gate FET, connected to receive a signal from the PWM output of the controller, wherein the emitters of said transistors are connected to the drain of the FET via respective emitter resistors.

5. An apparatus according to claim 1, wherein the light sources are controlled individually by respective first switching means, connected to be controlled from said 1-bit outputs, and collectively by second switching means, connected to the controlled from said PWM signal output, wherein the second switching means is connected in series with all of said first switching means.

6. A personal communications apparatus comprising:
a group of light sources; and
a programmable controller device having,
a plurality of 1-bit outputs each connected to a respective individual light source in the group of light sources for control thereof, and
a pulse width modulated signal (PWM) output for controlling an intensity of said group of light sources;
wherein each individual light source is controlled by said plurality of 1-bit outputs and said PWM output.

7. An apparatus according to claim 6, wherein each light source is controlled by a respective one of said 1-bit outputs.

8. An apparatus according to claim 6, including a plurality of bipolar transistors, connected to receive signals from respective 1-bit outputs of the controller device at their bases, wherein each light source is controlled by one of said transistors.

9. An apparatus according to claim 8, including an insulated-gate FET, connected to receive signals from the PWM output of the controller, wherein the emitters of said transistors are connected to the drain of the FET via respective emitter resistors.

10. An apparatus according to claim 6, wherein the light sources are controlled individually by respective first switching means, connected to be controlled from said 1-bit outputs, and collectively by second switching means, connected to the controlled from said PWM signal output, wherein the second switching means is connected in series with all of said first switching means.

11. A portable electronic apparatus comprising:
a plurality of groups of light sources; and
a programmable controller device having,
a plurality of 1-bit outputs each connected for enabling a respective individual one of the light sources in the groups of light sources, and
a plurality of pulse width modulated signal (PWM) outputs for controlling respective intensities of each of said groups of light sources;
wherein each light source is controlled by one of said 1-bit outputs and one of said PWM outputs.

12. An apparatus according to claim 11, wherein each light source is controlled by a respective one of said 1-bit outputs.

13. An apparatus according to claim 11, including a plurality of bipolar transistors, connected to receive signals from respective 1-bit outputs of the controller device at their bases, wherein each light source is controlled by one of said transistors.

14. An apparatus according to claim 13, including a plurality of insulated-gate FETs, connected to receive signals from one of said PWM outputs of the controller, wherein the emitters of said transistors are connected to the drain of at least one of the FETs via respective emitter resistors according to the groups to which the light sources, controlled by the transistors, belong.

15. An apparatus according to claim 11, wherein the light sources are controlled individually by respective first switching means, connected to be controlled from said 1-bit outputs, and groupwise by second switching means, connected to the controlled from said PWM signal outputs, wherein each second switching means is connected in series with all of said first switching means associated with the same group of light sources.

16. A portable electronic apparatus comprising:
a plurality of groups of light sources, each group having a plurality of individual light sources; and
a programmable controller device having,
a plurality of 1-bit outputs each connected for controlling a respective individual light source in the plurality of groups of light sources, and
a plurality of pulse width modulated signal (PWM) outputs for controlling an output intensity of respective ones of said groups of light sources;
wherein each light source is controlled by one of said 1-bit outputs and one of said PWM outputs.

17. An apparatus according to claim 16, wherein each light source is controlled by a respective one of said 1-bit outputs.

18. An apparatus according to claim 16, including a plurality of bipolar transistors, connected to receive signals from respective 1-bit outputs of the controller device at their bases, wherein each light source is controlled by one of said transistors.

19. An apparatus according to claim 18, including a plurality of insulated-gate FETs, connected to receive signals from one of said PWM outputs of the controller, wherein the emitters of said transistors are connected to the drain of at least one of the FETs via respective emitter resistors according to the groups to which the light sources, controlled by the transistors, belong.

20. An apparatus according to claim 16, wherein the light sources are controlled individually by respective first switching means, connected to be controlled from said 1-bit outputs, and groupwise by second switching means, connected to the controlled from said PWM signal outputs, wherein each second switching means is connected in series with all of said first switching means associated with the same group of light sources.

21. A portable electronic apparatus comprising a body and a soft structure on the body, wherein the soft structure is visible light transmissive and a group of light sources are mounted to the body so as to shine light through said soft structure, the apparatus further including:
a programmable controller device having,
a plurality of 1-bit outputs each connected and configured for controlling a respective individual light source in the group of light sources, and
a pulse width modulated signal (PWM) output configured for controlling an intensity of the group of light sources;
wherein each light source is controlled by the 1-bit outputs and the PWM output.

22. An apparatus according to claim 21, wherein each light source comprises at least one LED.

23. An apparatus according to claim 21, including a plurality of soft structures on the body, wherein each soft structure is visible light transmissive and the group of light sources is mounted to the body to shine light through said structures.

24. An apparatus according to claim 23, including:
a plurality of groups of light sources mounted to the body for shining light through said structures,
wherein the programmable controller device includes a further plurality of 1-bit outputs, each 1-bit output of the controller being connected and configured for controlling a respective individual light source in one of the plurality of groups of light sources, and a plurality of pulse width modulated signal outputs for controlling respective ones of the groups of light sources, and wherein each light source is controlled by one of the 1-bit outputs and one of the PWM outputs.

25. An apparatus according to claim 21, wherein the apparatus is a personal communication device.

26. An apparatus according to claim 24, wherein the apparatus is a personal communication device.

* * * * *